United States Patent [19]
Nishimura et al.

[11] Patent Number: 4,911,135
[45] Date of Patent: Mar. 27, 1990

[54] INTAKE AIR COOLING ARRANGEMENT FOR TURBOCHARGED INTERNAL COMBUSTION ENGINE

[75] Inventors: Masahiro Nishimura, Yokohama; Takeshi Ayabe, Fujisawa, both of Japan

[73] Assignee: Nissan Motor Co., Ltd., Japan

[21] Appl. No.: 295,866

[22] Filed: Jan. 11, 1989

[30] Foreign Application Priority Data

Jan. 18, 1988 [JP] Japan ................. 63-4343[U]

[51] Int. Cl.$^4$ ............................. F02B 29/04
[52] U.S. Cl. ....................... 123/563; 180/68.1
[58] Field of Search ............ 60/599; 123/563; 180/68.1, 68.3

[56] References Cited

U.S. PATENT DOCUMENTS

| 4,716,734 | 1/1988 | Nakao et al. | 60/599 |
| 4,831,981 | 5/1989 | Kitano | 123/563 X |

FOREIGN PATENT DOCUMENTS 13635 1/1984 Japan ................. 123/563

Primary Examiner—Michael Koczo
Attorney, Agent, or Firm—Lowe, Price, Leblanc, Becker & Shur

[57] ABSTRACT

Disclosed herein is an intake air cooling arrangement for a turbocharged internal combustion engine which comprises an intercooler for cooling the air which is conveyed from a turbocharger to an intake manifold of the engine; a first structure for mounting the intercooler just above the intake manifold; and a second structure for defining an air flowing way through which the outside air is forced to flow under running of the vehicle, wherein the intercooler and the intake manifold are arranged in the air flowing way so that the outside air which has passed through the intercooler is directed toward the intake manifold to cool the same.

6 Claims, 2 Drawing Sheets

FIG. 4 *(PRIOR ART)*

INTAKE AIR COOLING ARRANGEMENT FOR TURBOCHARGED INTERNAL COMBUSTION ENGINE

BACKGROUND OF THE INVENTION

1. Field of the Invention

The present invention relates in general to an air cooling arrangement for a turbocharged internal combustion engine, and particularly, to an arrangement of an intercooler which cools, by using the outside air, the air which is conveyed from a turbocharger to an intake manifold of the engine. More specifically, the present invention is concerned with an arrangement by which the outside air used for cooling the intercooler is reused for cooling particular portions of the intake manifold of the engine for preventing the undesired "vapor lock" and the like.

2. Description of the Prior Art

In order to clarify the task of the present invention, one conventional air cooling arrangement for a turbocharged internal combustion engine will be outlined with reference to FIG. 4 of the accompanying drawings, which is disclosed in Japanese Utility Model First Provisional Publication No. 59-13635.

In the drawing, denoted by numeral 2 is a cylinder head of an internal combustion engine mounted in an engine room of a motor vehicle. A rocker cover 18 is disposed on the cylinder head 2. To one side wall 2b of the cylinder head 2, there is connected an exhaust tube 11 which carries thereon a turbocharger 9, while, to the other side wall 2a of the cylinder head 2, there is mounted an intake manifold 31 which has branch portions curved to extend upward. Denoted by numerals 12 and 13 are fuel injection valves and a fuel conveying tube which are mounted to the intake manifold 31. The turbocharger 9 and the intake manifold 31 are connected through an air-cooled type intercooler 7 which is arranged just above the rocker cover 18. The intercooler 7 is disposed in an air flowing way extending from an air intake bulge 22 formed on an engine room hood of the vehicle, so that the intercooler 7 can be exposed to the outside air (as indicated by the white arrows) which is fed into the way when the vehicle runs.

In operation, compressed and heated air is forced to flow, as indicated by the black arrows, from the turbocharger 9 to the intake manifold 31 through the intercooler 7. In the intercooler 7, heat exchanging is carried out between the heated air from the turbocharger 9 and the outside air from the air intake bulge 22, so that the air practically fed to the engine lowers its temperature. With this, the air charging effeciency of the engine is increased.

However, the above-mentioned conventional air cooling arrangement has the following drawbacks due to its inherency.

First, since the intercooler 7 is located just above the rocker cover 18, the outside air passing through the intercooler 7 is prevented from smoothly flowing toward the intake manifold 31. Thus, cooling for the fuel injection valves 12 and the fuel conveying tube 13 is not effectively achieved, so that the engine tends to undergo the undesired "vapor lock" at idling operation just after high speed cruising of the vehicle and/or at slow movement of the vehicle because of a heavy traffic or the like.

Second, because the intercooler 7 is mounted above the rocker cover 18, the entire height of the engine system is increased thereby narrowing the freedom of design of the vehicle to which the engine system is practically applied. Furthermore, due to the same reason, it is difficult or at least troublesome to change ignition plugs of the engine.

SUMMARY OF THE INVENTION

It is therefore an object of the present invention to provide an air cooling arrangement for a turbocharged internal cumbustion engine, which is free of the above-mentioned drawbacks.

According to the present invention, there is provided an air cooling arrangement by which the outside air which has passed through the intercooler flows smoothly toward the intake manifold.

According to the present invention, there is provided an intake air cooling arrangement for a turbocharged internal combustion engine, which comprises an air cooled type intercooler for cooling the air conveyed from a turbocharger to an intake manifold, first means for mounting the intercooler above the intake manifold, and second means for defining an air flowing way in which the intercooler and the intake manifold are disposed.

BRIEF DESCRIPTION OF THE DRAWINGS

Other objects will become apparent from the following description when taken in conjunction with the accompanying drawings, in which:

FIG. 4 is a view similar to FIG. 1, but showing a conventional air cooling arrangement.

DETAILED DESCRIPTION OF THE INVENTION

Figure 1:
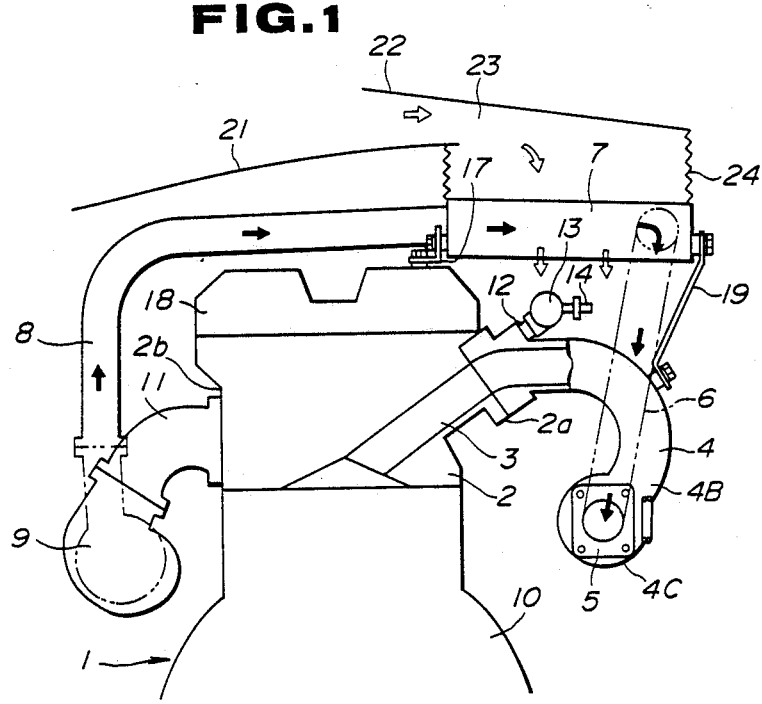
FIG. 1 is a schematically illustrated front view of the air cooling arrangement of the present invention.

An embodiment of the present invention will be described in the following with reference to FIGS. 1 to 3. For easy understanding, the same parts as those in the above-mentioned conventional arrangement will be denoted by the same numerals.

As is shown in the drawings, the embodiment of the present invention is an arrangement incorporated with an in-line four cylinder type internal combustion engine 1. Denoted by numeral 2 is a cylinder head of the engine 1, which has one side wall 2b having an exhaust tube 11 mounted thereto. A turbocharger 9 is carried by the exhaust tube 11.

The other side wall 2a of the cylinder head 2 is equipped with an intake manifold 4. As is best seen from FIG. 2, the intake manifold 4 comprises four curved branch portions 4B which are respectively connected to intake ports 3 (see FIG. 1) of the cylinder head 2 and a hollow base portion 4C from which the branch portions 4B extend individually. As shown, the intake manifold 4 is so arranged that the hollow base portion 4C is positioned below the branch portions 4B.

The branch portions 4B are respectively equipped with fuel injection valves 12 to which a fuel conveying tube 13 is connected. As is seen from FIG. 1, the fuel conveying tube 13 extends along the side wall of the cylinder head 2. A fuel inlet tube 14 and a fuel outlet tube 15 are connected to the fuel conveying tube 13 to constitute a fuel circuit through which a fuel under pressure flows. During operation of the engine 1, the fuel is injected into the intake ports 3 by the injection valves 12 one after another.

In accordance with the present invention, an intercooler 7 is arranged just above the branch portions 4B of the intake manifold 4 for the reasons which will become apparent as the description proceeds.

Figure 2:
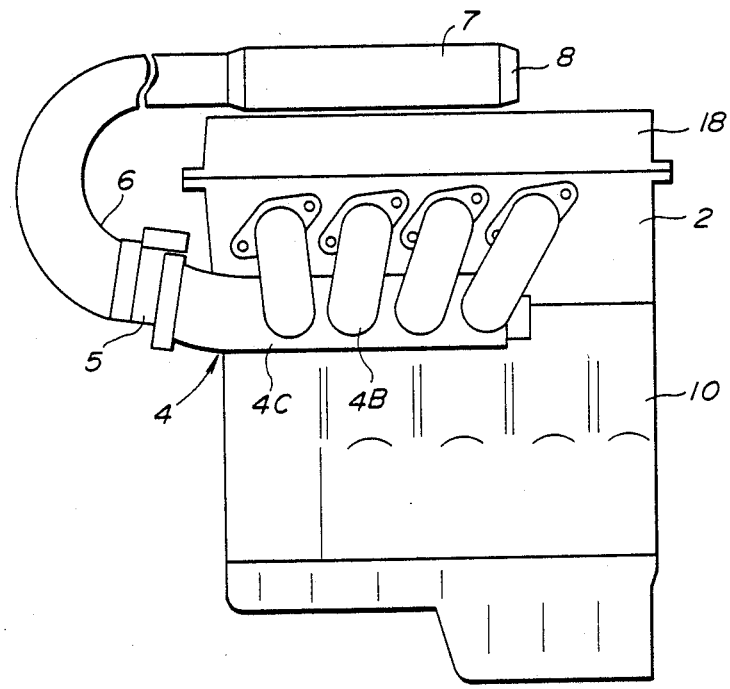
FIG. 2 is a side view of the air cooling arrangement.
Figure 3:
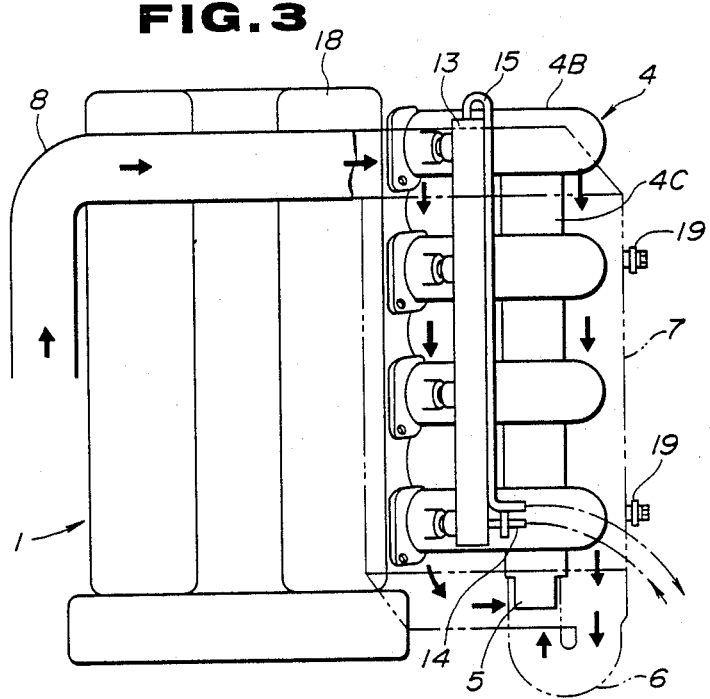
FIG. 3 is a plan view of the air cooling arrangement.
Figure 3:
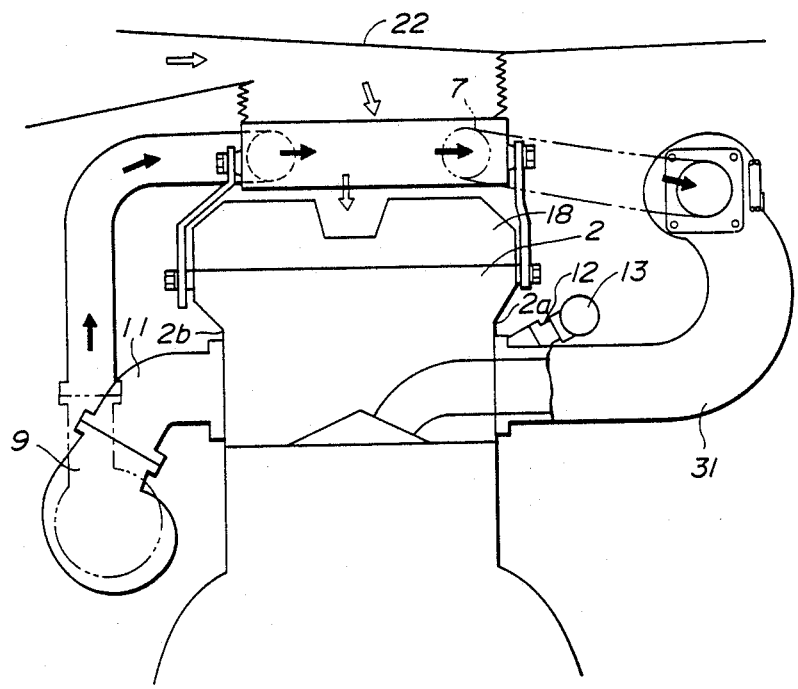

As is seen from FIGS. 2 and 3, in the illustrated embodiment, the intercooler 7 is arranged just above the intake manifold 4 in a manner to cover at least three of the branch portions 4B of the intake manifold 4. Two shorter brackets 17 and two longer brackets 19 are employed for tightly holding the intercooler 7 above the intake manifold 4. That is, each shorter bracket 17 connects one side portion of the intercooler 7 to a rocker cover 18 of the engine 1 and each longer bracket 19 connects the other side portion of the intercooler 7 to the branch portion 4B of the intake manifold 4.

An inlet part of the intercooler 7 is connected to the turbocharger 9 through an air duct 8, while, an outlet part of the intercooler 7 is connected to the hollow base portion 4C of the intake manifold 4 through another air duct 6. An air throttle chamber 5 is located at the inlet part of the hollow base portion 4C of the intake manifold 4.

Upon assembly in an engine room, the intercooler 7 is exposed to an interior 23 of an air duct 24 which extends from an air intake bulge 22 formed on a hood 21 of the engine room. The opening of the air intake bulge 22 faces forward of the motor vehicle, so that during running of the vehicle, the outside air is effectively introduced into the air duct 24.

The intercooler 7 is of a cross-flow type which comprises a first group of parallel passages and a second group of parallel passages which groups intersect at generally right angles. The compressed and heated air from the turbocharger 9 flows through the first parallel passages as is indicated by the black arrows in FIG. 1, and the outside air from the air intake bulge 22 flows through the second parallel passages as is indicated by the white arrows. Thus, in the intercooler 7, heat exchanging is carried out between the heated air from the turbocharger 9 and the outside air from the air intake bulge 22, so that the air practically fed to the engine 1 is cooled thereby increasing the air charging efficiency of the engine 1.

In the following, advantages of the present invention will be described.

Because the intercooler 7 is located just above the intake manifold 4, the outside air which has passed through the second parallel passages of the intercooler 7 can flow smoothly toward the intake manifold 4 to cool the same. Thus, the fuel injection valves 12 and the fuel conveying tube 13 which are mounted on the intake manifold 4 are cooled by the outside air from the air intake bulge 22. Thus, the undesired "vapor lock" and the like of the engine 1 are prevented.

Because the intercooler 7 is not located above the rocker cover 18, the outside air from the air intake bulge 22 can flow smoothly through the intercooler 7. This induces increase in cooling efficiency of the intercooler 7.

Because the intake manifold 4 is so arranged that the branch portions 4B thereof extend downward from the intake ports of the cylinder head 2, the entire height of the engine system is not increased. Thus, the intake air cooling arrangement of the invention is widely applicable to various types of motor vehicles including a slanted nose motor vehicle.

What is claimed is:

1. An intake air cooling arrangement for a turbocharged internal combustion engine of a motor vehicle, which comprises:
   an intercooler for cooling the air which is conveyed from a turbocharger to an intake manifold of the engine;
   first means for mounting said intercooler just above said intake manifold; and
   second means for defining an air flowing way through which the outside air is forced to flow under running of the vehicle,
   wherein said intercooler and said intake manifold are arranged in said air flowing way so that the outside air which has passed through the intercooler is directed toward the intake manifold to cool the same.

2. An intake air cooling arrangement as claimed in claim 1, in which said second means comprises:
   an air duct having an interior to which one face of said intercooler is exposed; and
   an air intake bulge formed on a hood of an engine room of the motor vehicle, said air intake bulge having air intake opening which is communicated with the interior of said air duct and faced forward of the motor vehicle.

3. An intake air cooling arrangement as claimed in claim 2, in which said intake manifold carries thereon fuel injection valves and a fuel conveying tube which are exposed to said air flowing way of the outside air.

4. An intake air cooling arrangement as claimed in claim 3, in which said intake manifold is so arranged that respective branch portions thereof extend downward from corresponding intake ports of a cylinder head of the engine to a common hollow base portion thereof.

5. An intake air cooling arrangement as claimed in claim 4, in which said first means comprises:
   a shorter bracket for connecting a portion of said intercooler to a cylinder head of the engine; and
   a longer bracket for connecting the other portion of said intercooler to said intake manifold.

6. An intake air cooling arrangement as claimed in claim 5, in which said intercooler is of a cross-flow type which comprises first parallel passages and second parallel passages which intersect at generally right angles.

* * * * *